United States Patent [19]
Cubalchini

[11] Patent Number: 4,556,092
[45] Date of Patent: Dec. 3, 1985

[54] GAS CHARGING FIXTURE FOR HYDROPNEUMATIC SHOCK ABSORBERS AND THE LIKE

[75] Inventor: Joseph Cubalchini, St. Charles, Ill.

[73] Assignee: Maremont Corporation, Carol Stream, Ill.

[21] Appl. No.: 587,889

[22] Filed: Mar. 9, 1984

Related U.S. Application Data

[63] Continuation-in-part of Ser. No. 567,266, Dec. 30, 1983, abandoned.

[51] Int. Cl.⁴ .................................................. B65B 3/04
[52] U.S. Cl. .................................. 141/98; 141/392; 137/860; 188/322.21; 277/212 C
[58] Field of Search ............... 267/64.28; 188/322.21, 188/322.15, 322.16, 322.17; 222/402.16; 137/860; 141/1, 4, 3, 20, 197, 716.2, 98, 37–68; 277/212 C, 192–199

[56] References Cited

U.S. PATENT DOCUMENTS

| | | | |
|---|---|---|---|
| 2,140,778 | 12/1938 | White | 277/212 C |
| 3,595,552 | 7/1971 | Nicholls | 267/64.28 |
| 4,114,866 | 9/1978 | Kato | 267/64.28 |
| 4,194,731 | 3/1980 | Marx | 267/64.28 |
| 4,219,190 | 8/1980 | Nagase | 267/64.28 |
| 4,335,871 | 6/1982 | Mölders | 267/64.28 |
| 4,446,895 | 5/1984 | Kato | 141/4 |
| 4,483,377 | 11/1984 | Cubalchini | 267/64.28 |

FOREIGN PATENT DOCUMENTS

| | | | |
|---|---|---|---|
| 0068685 | 12/1975 | Japan | 267/64.28 |
| 0069339 | 5/1980 | Japan | 267/64.28 |

Primary Examiner—Houston S. Bell, Jr.
Attorney, Agent, or Firm—Allegretti, Newitt, Witcoff & McAndrews, Ltd.

[57] ABSTRACT

A charging fixture for gas charging a damper includes a pair of body members adapted to be forced together under pressure. Alignment pins align the body members as they are forced together. Compressable elastomeric members define a cavity in the body members and are disposed in the body members and sized for compressing and deforming portions of an outer cylinder surface of the damper during charging. A passageway to the cavity is connected to a high pressure source of gas, and the damper is charged by gas entering from the cavity by displacement of a piston rod seal from along an intermediate cylinder head.

4 Claims, 8 Drawing Figures

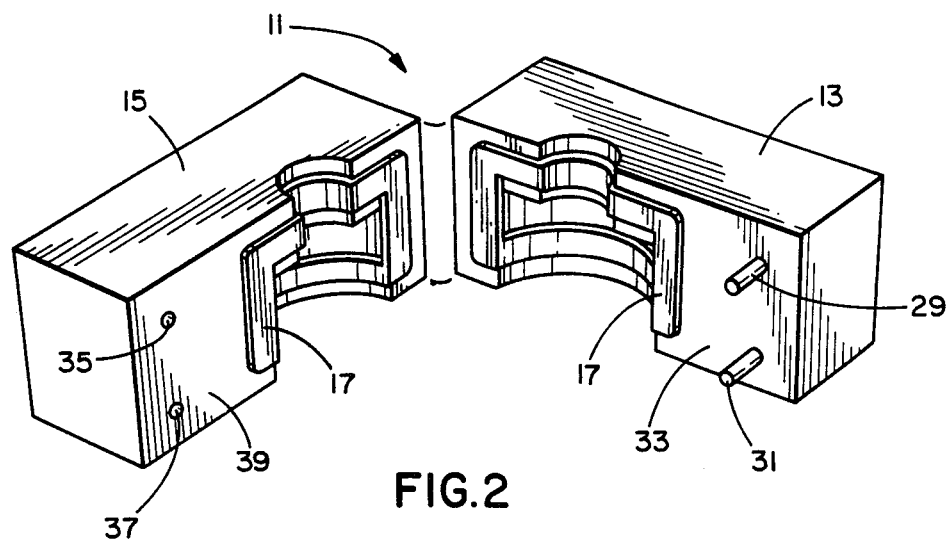
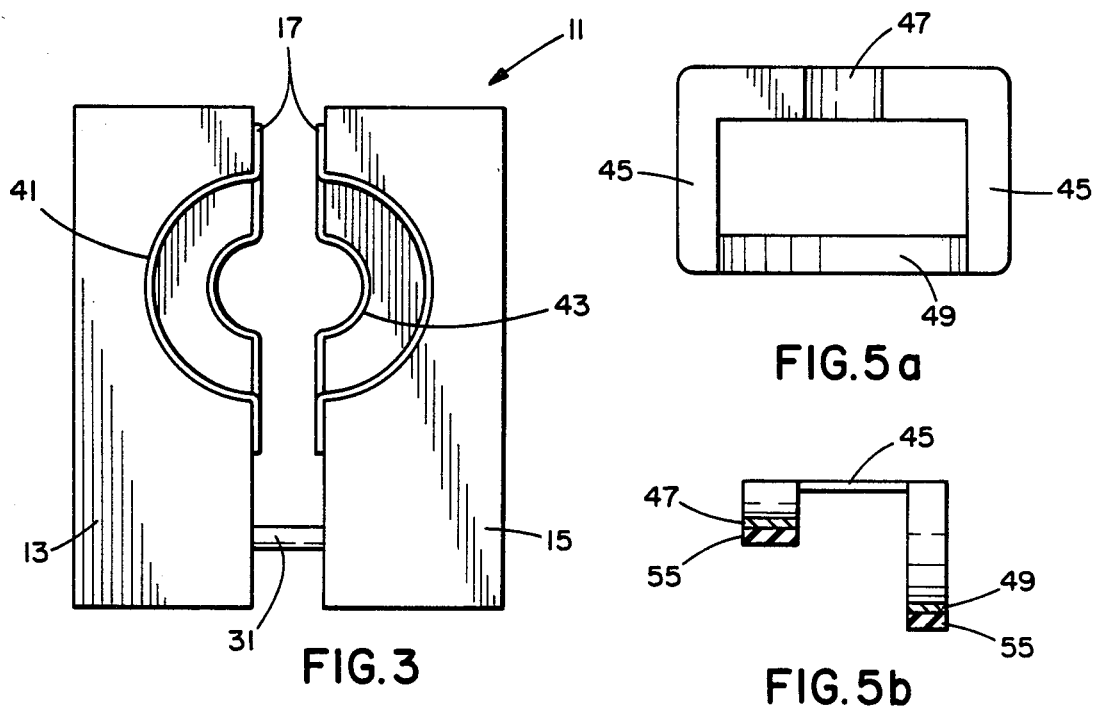
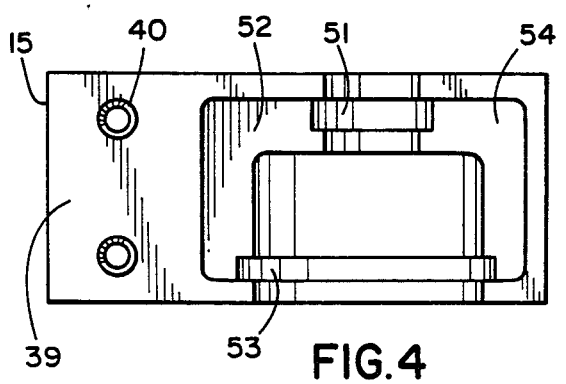
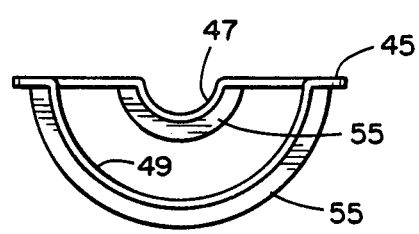

4,556,092

GAS CHARGING FIXTURE FOR HYDROPNEUMATIC SHOCK ABSORBERS AND THE LIKE

This application is a continuation-in-part of application Ser. No. 567,266, filed Dec. 30, 1983, now abandoned.

BACKGROUND OF THE INVENTION

This invention relates to a gas charging fixture for pressurizing a shock absorber, strut, gas spring or the like. More particularly, in one embodiment, the invention relates to a charging fixture which serves additionally to compress the shock in the area of the inner cylinder head seal for enhancing the sealing action of the seal.

Heretofore, shock absorbers have been pressurized by drilling a hole in the outer wall of the shock cylinder. After pressurizing the cylinder through the drilled passage, the passage is sealed by pressing a plug or ball into the passage. Alternatively, the passage may be sealed by welding after the passage has been closed by the plug.

This method requires several operations such as drilling and welding which, at best, impose additional expense and the chance that metal chips or weld contaminants may be introduced into the damper assembly.

To overcome these disadvantages, another method of pressurizing shock absorbers applies gas pressure against the piston rod wiper seals, forcing the seal away from the intermediate cylinder head and permitting the gas to pass into the shock. The present invention provides a gas charging fixture for use with such a method. More particularly, a particular embodiment of the charging fixture serves to deform the shock absorber casing in order to enhance the sealing action of the inner cylinder head seal of the shock absorber.

SUMMARY OF THE INVENTION

It is an object of the present invention to provide an improved gas charging fixture for use to pressurize vehicle dampers, fluid springs, shock absorbers, struts, gas springs and the like.

It is another object of the present invention to provide a charging fixture which serves to enhance the sealing capabilities of the inner cylinder head seal of a shock absorber being pressurized.

These and other objects of the invention are accomplished in a charging fixture formed of a pair of mating body members which are aligned and forced together in mated configuration about the top portion of the shock. The mating of the body members provides a gas pressure chamber surrounding the shock in the area of the piston rod wiper seal. Gas under pressure is fed into the chamber displacing the rod wiper seal forcing entry of the gas within the shock cylinder. Additionally, one embodiment of the fixture deforms inwardly the intermediate cylinder of the shock absorber in the area of the inner cylinder head seal during force mating, thereby increasing the compression of the seal and enhancing its sealing action.

BRIEF DESCRIPTION OF THE DRAWINGS

FIG. 2 is a perspective view of a preferred charging fixture embodiment;

FIG. 3 is a top view of the charging fixture of FIG. 2;

FIG. 4 is a side view of one member of the charging fixture of FIG. 2;

FIGS. 5a through 5c are several views of the rubber member of the charging fixture of FIG. 2.

DESCRIPTION OF THE PREFERRED EMBODIMENT

Figure 1:
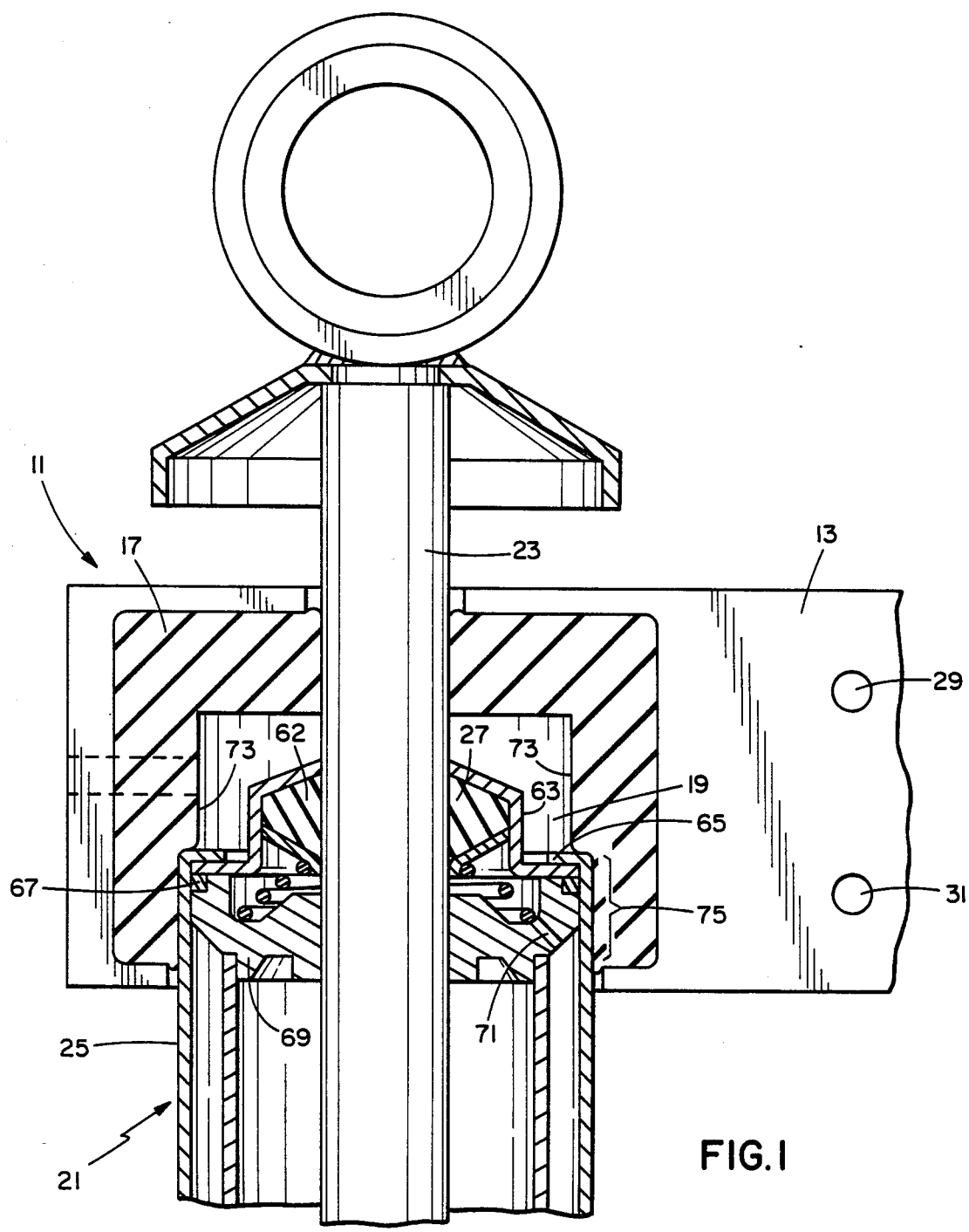
FIG. 1 is a general cross sectional side view of a shock absorber within one member of the preferred charging fixture embodiment.

Referring to FIGS. 1 through 4, a charging fixture 11 includes a pair of body members 13, 15 which are forced together in a mating configuration about a hydropneumatic damper unit 21. Each body member carries a compressible elastomer member 17 which is shaped to form a cavity 19 when the members are mated. Members 17 form a pressurized seal against the piston rod 23 and outer cylinder casing 25 of the damper unit 21, sealing the upper portion of the damper unit 21 within the cavity 19. The cavity 19 is supplied with pressurized gas, forcing a rod wiper seal 27 of the damper unit 21 away from the inner cylinder head for movement of the gas into the damper unit 21.

Referring to FIGS. 2 and 3, the body members 13, 15 are aligned in mating registration with each other by a pair of alignment pins 29, 31 which extend outwardly from a flat contact surface 33 of the body member 13. The pins 29, 31 are received by a pair of apertures 35, 37 formed in a contact surface 39 of the body member 15. The body members 13, 15 are aligned by movement of the pins 29, 31 into the apertures 35, 37 and bringing together the contact surfaces 33, 39. A chamfer 40, shown in FIG. 4, is provided to apertures 35, 37 for aiding the entry of the pins 29, 31 into the apertures.

Each face of the body members 13, 15 is generally rectangular in shape and has a cavity section 41, 43, shown in FIG. 4. The cavity sections 41, 43 together form the cavity 19 when the body members 13, 15 are forced together. The body members 13, 15 are molded from a rigid material, for example, aluminum.

The compressible elastomeric members 17 are mirror images of one another and are housed in the cavity sections 41, 43 of the body members 13, 15. As shown in FIGS. 5a through 5c, each compressible member 17 is molded to include a thin-section face seal 45. The face seal 45 rests atop its associated contact surface 33, 39. A pair of generally semi-circular seals 47, 49 depend from the face seal 45 and rest in corresponding semi-circular grooves 51, 53, shown in FIG. 4, which are formed as part of the cavity sections 41, 43. Shallow grooves 52, 54 may be formed in the contact surfaces 33, 39 for registering the face seals 45.

As illustrated in FIGS. 5b and 5c, two semi-circular seal portions 47, 49 include a thick section 55 which serves as a retaining member being disposed in the grooves 51, 53.

Referring again to FIG. 1, the rod seal 27 is deflected downward and inward away from the interior surface of a cap 63 (against which the wiper seal 27 is seated) by high pressure gas within the cavity. The deflection forms a path for the gas to enter the interior of the damper unit 21. The outer casing 25 of the damper unit 21 ends in a radially inward projecting top lip 65 which is formed over the peripheral edge of the cap 63. A conventional inner cylinder head seal 76 having a rectangular shaped cross-section is disposed in the corner junction of the cap 63 and the outer casing 25. The inner cylinder head seal 67 prevents gas leakage at the junction of the cap 63 and the casing 25. The inner cylinder head seal 67 may be formed from a special elastomer, for example, neoprene that tends to swell when brought into contact with hydraulic fluid contained within the chambers of the damper unit 21.

An inner cylinder head 69 is formed from a material porous to air but relatively impervious to oil. A passage 71 is formed in the inner cylinder head 69 for communicating pressurized gas and hydraulic fluid above and below the inner cylinder head 69.

As shown in FIG. 1, the cavity walls 73 of elastomer member 17 have a radial dimension slightly smaller than the radial dimension of the casing 25 of the damper unit 21. This provides an excess of rubber in the area 75 of the casing 25 adjacent the inner cylinder head seal 67.

When the two body members 13, 15 are forced together, the amount of elastomer material of member 17 in the area 75 of casing 25 compresses. However, the radial dimension of the cavity walls 73 of the rubber member 17 provide an excess of rubber material in the deformation area 75 of the cylinder casing 25 such that the cylinder casing 25 is deformed by the pressure exerted by the compressible member 17 when the two body members 13, 15 of the charging fixture are forced together. This yielding deformation of the area 75 of the cylinder casing 25 serves to enhance sealing action of the inner cylinder head seal 67.

Figure 6:
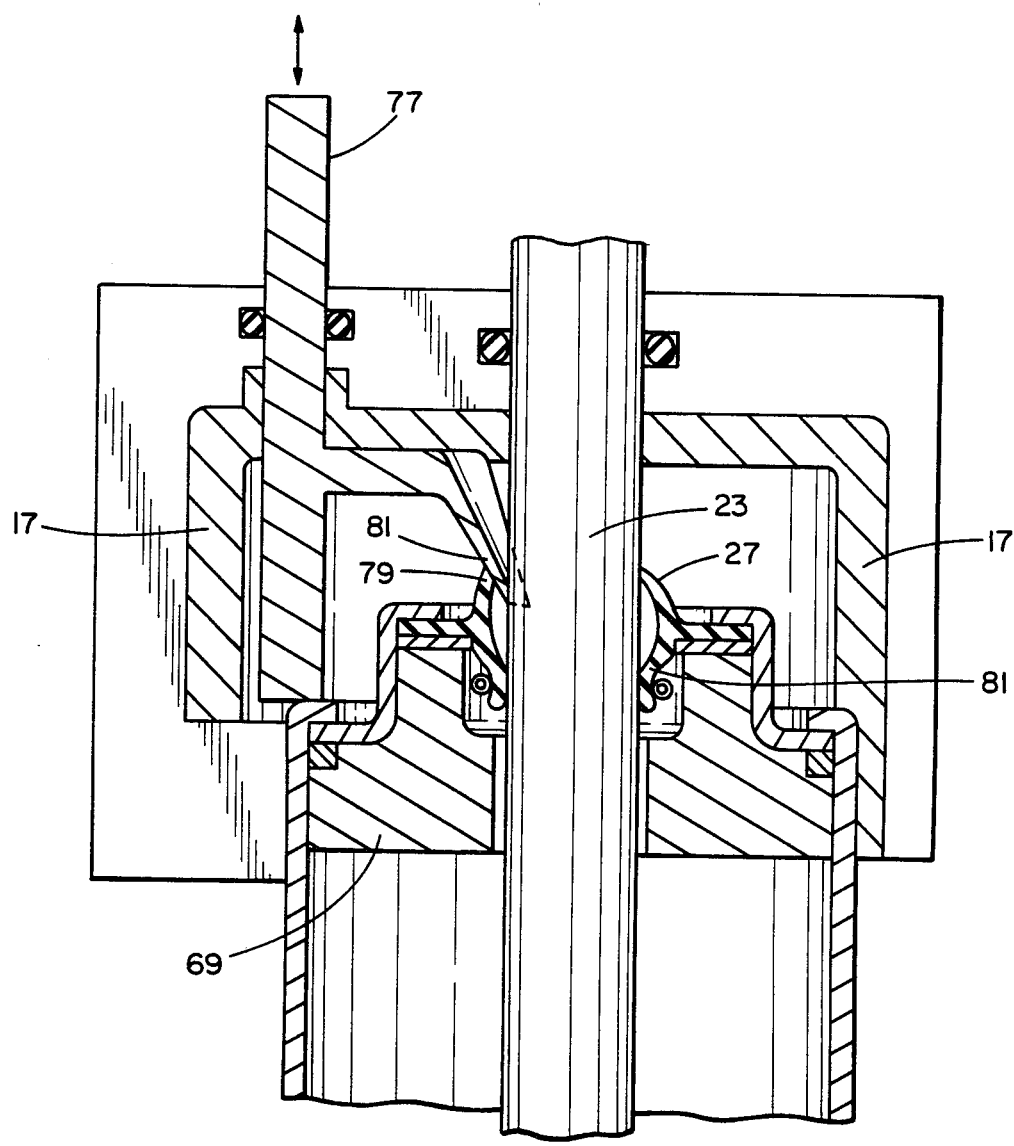
FIG. 6 is a cross-section view of a shock absorber within one member of a second preferred charging fixture embodiment.

In the second preferred embodiment of the invention, shown in FIG. 6, a mechanical deflecting device 77 is secured to one of the elastomeric members 17. The deflecting device serves to deflect the wiper seal 27 away from the rod 23 for passing the pressurized gas along the rod 23 and into the internal chambers above, and thus below, the inner cylinder head 69. The seal 27 is, as in FIG. 6, a single lip seal having an upper dirt lip 79 and a lower sealing lip 81. The deflecting device 77 deflects only the dirt lip 79. The pressurized gas passing along the piston rod 23 deflects the sealing lip 81.

The mechanical deflecting device 77 is guided against the seal 27 by the operator maneuvering the damper unit 21 against the deflecting device 77 and then into the body members 13, 15. The deflecting device 77 is formed from a portion of a cylindrical surface which is tapered to a seal confronting front edge 83, for conforming with the piston rod 23. Further, the deflecting device 77 is canted upwardly from the body member and may be pivotally mounted with respect thereto for easily displacing the seal 27 as the operator maneuvers the damper unit 21 into the body members.

It is to be understood, of course, that the foregoing describes preferred embodiments of the present invention and that modifications may be made therein without departing from the spirit or scope of the present invention as set forth in the appended claims.

What is claimed:

1. A charging fixture for gas charging a damper, the damper having an intermediate cylinder head, an outer cylinder with an outer cylinder surface and a piston rod seal displaceable by pressurized gas entering along the intermediate cylinder head, the charging fixture comprising:

a pair of body members adapted to be forced together under pressure;

guide means for aligning said body members when said body members are forced together;

means defining a cavity in said body members, the cavity being of a size of receiving the damper, the cavity communicating with the piston rod seal of the damper for deforming the seal when pressurized gas is within the cavity;

said cavity-defining-means including a compressible material disposed in the cavity for compressibly receiving the outer cylinder surface of the damper in the proximate area of the inner head seal, the compressible material being sized for compressing the outer cylinder surface of the damper when the body members are forced together, for deforming portions of the outer cylinder contiguous to the intermediate cylinder head seal for enhancing the sealing action of the intermediate cylinder head seal;

passageway means connecting said cavity externally of said members; and means for connection of said passageway means to a high pressure source of gas.

2. A charging fixture according to claim 1 wherein said pair of body members is formed from a rigid material and is shaped to form a second cavity comprising a cavity section formed in each of said body members, said second cavity means for receiving said cavity defining means and wherein said cavity defining means is formed from a pair of compressible members formed from said compressible material.

3. A charging fixture according to claim 2 wherein said guide means includes pin means formed in one of said body member and aperture means formed in the other of said body member, said aperture means receiving said pin means to align the cavity sections of each of said body members.

4. A charging fixture according to claim 1 further comprising a mechanical deflecting device adapted to deflect the piston rod seal away from the piston rod for passing the pressurized gas along the rod.

* * * * *